A. McMURTRIE.
ATTACHMENT FOR ELECTRICAL CONDUITS.
APPLICATION FILED APR. 1, 1915.
1,207,958. Patented Dec. 12, 1916.
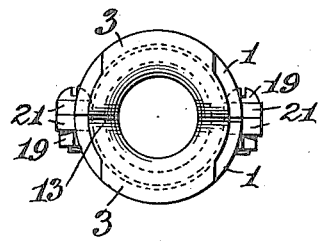
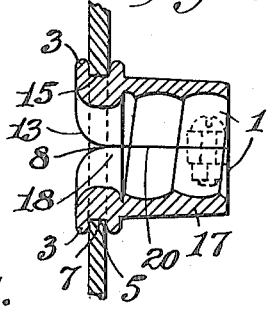
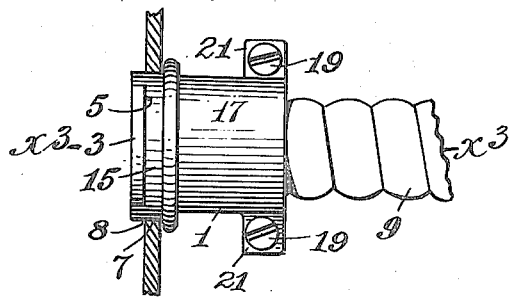
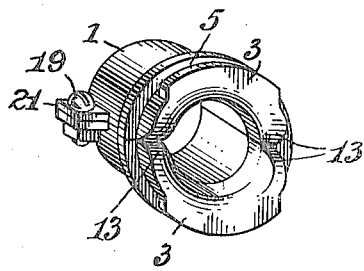
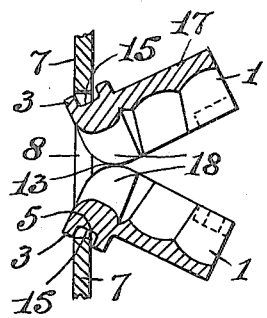
Attest:
W. J. McGinn
R. Stanton Mayer
Adrah McMurtrie Inventor:
by Alexander C. Proudfit,
Atty

UNITED STATES PATENT OFFICE.

ADNAH McMURTRIE, OF NEW YORK, N. Y., ASSIGNOR TO THOMAS & BETTS COMPANY, OF NEW YORK, N. Y., A CORPORATION OF NEW YORK.

ATTACHMENT FOR ELECTRICAL CONDUITS.

1,207,958.

Specification of Letters Patent.

Patented Dec. 12, 1916.

Application filed April 1, 1915. Serial No. 18,598.

*To all whom it may concern:*

Be it known that I, ADNAH McMURTRIE, of New York, N. Y., have invented certain Improvements in Attachments for Electrical Conduits, of which the following description, in connection with the accompanying drawings, is a specification, like characters on the drawings designating like parts.

This invention relates to attachments for electrical conduits, and particularly to devices for securing the end of a pipe or sheath for electrical conductors to an outlet box or other electrical conduit member in which there exists an outlet aperture my present invention having for its primary object certain improvements in a device of the type forming the subject of my application for Letters Patent Serial No. 848,706. One form of my said device illustrated in application 848,706 comprises a plurality of semi-cylindrical segments having retaining flanges with grooved peripheries constructed to be assembled in opposed relation, their flanges being of such dimensions that their combined diameter will permit their introduction within a hole of greater breadth than that of the retaining flanges when their segments are assembled in cylindrical arrangement upon the end of a pipe, and these flanges being of such size that when the segments are forced apart bodily, the peripheral groove will receive the wall of the outlet box and the flanges prevent displacement of the flanged head axially relatively to the outlet box wall.

An important object of my present invention is to so construct these segments and their flanges as to provide for automatic tilting of the flanges into retentive position by the mere approach of the body portions of the segments into their normal position for engagement of the cylindrical conduit, thus obviating the need for specially arranged set screws or other means to force the segments apart bodily, the withdrawal of the device being provided for by a similar tilting movement to cause the flanges to approach the axis of the device, and any suitable construction of the parts may be adopted for this purpose. Preferably, the segments are cast or formed with rounded shoulders symmetrically arranged to furnish respectively a fulcrum so that opposed segments may be tilted in contact with each other, to present the retaining flanges obliquely forward in contracted relation to enter the aperture, and then tilted back into expanded radial position for retentive engagement of the flanges with the walls of the aperture. Preferably, the segments are furnished with securing means, such as bolts and nuts, to hold them in assembled cylindrical relation, clamped upon the pipe end, and with their retaining flanges in place for engagement with the hole-walls.

Among other objects of importance, is the construction and arrangement of the parts in such a fashion that the mere setting of the segment bodies firmly upon the conduit will also cause expansion of the flange bearing portions into firm contact with the walls of the aperture, so that by this radial engagement, the connector will bind itself to the walls against rotative displacement, and will also complete the electrical contact which is desirable in a large proportion of instances where connectors are installed. I may also stamp up the connector out of sheet metal, beginning with a flat blank cut by a die of suitable contour and then bent into substantially cylindrical form, with an opening along one side, the edges of the sheet material along this opening being of suitable contour to form at one region a fulcrum, while near one end of the cylinder the metal is curled to form a retaining flange the diameter of which can be expanded by pressing together the walls of the cylinder at a region beyond the fulcrum point, as by means of a bolt and nut engaged with lugs provided in bending up the sheet metal at that region. So also, I may construct such a connection of two stamped up sheet metal segments.

The various features of my invention will be illustrated and described fully in the accompanying drawings and specification and pointed out in the claims.

In the drawings, Figure 1 illustrates in plan view a connector for electrical outlet boxes, in the construction of which my invention has been embodied and which is shown in place connecting a conduit to an apertured wall of an outlet box; and Fig. 2 is a view of the same in front elevation; while Fig. 3 is a vertical, sectional view thereof taken on the line $x^3$—$x^3$ in Fig. 1; Fig. 4 is a view similar to Fig. 3 of the connector, but showing its segments tilted, ready for emplacement; and Fig. 5 is a view of the connector in perspective.

In the embodiment of my invention selected for illustration and description to permit ready and complete understanding of my improvements, each of the parts designated by the reference numeral 1 is a segment of the body portion of my device made of any suitable material, such as metal cast in semi-cylindrical contour, and provided with retaining flanges 3, grooved as at 5 to receive the walls 7 of the aperture 8 in an outlet box to which the connector is utilized to secure the electrical conductor sheath or pipe 9. In accordance with an important feature of my invention, these segmental members have their retaining flanges 3 formed of less than a complete semi-circle, and their mouths shaped to form lips or fulcra 13, to facilitate the turning of the segments on each other into the position shown in Fig. 4 for insertion within the aperture 8 of the outlet box. These apertures are of standard dimensions, usually, and I prefer to form the segments of such diameter that when assembled and expanded as shown in Fig. 3 the bottoms 15 of the grooved portions 5 will be forced against the contiguous aperture walls 7 with sufficient firmness to bind the connector against rotation therewithin, and preferably the body portions 17 of the segments will be designed to contact retentively at the same time with the conduit sheath or pipe 9. Any suitable construction may be adopted to effect this spreading action, and as one convenient form of structure for the purpose I have shown the adjacent edges of the segments as crowned slightly, as at 18, to rock on each other, so that when the outer ends of the segment bodies 17 are contracted, the flange ends will be expanded. So also, any suitable means may be provided to cause the rocking action and secure the connector in this assembled position, and as one convenient form of means for this purpose, I have shown retaining bolts 19 passing through the apertured lugs 21 of the connector bodies 17, the proportions of the parts being preferably such that when the bolts 19 are tightened the bodies 17 will be clamped upon conduit 9 with little or no clearance along the line of juncture 20, and the groove bottoms 15 will be engaged with the aperture walls 7 as above mentioned.

Having illustrated and described my invention thus fully and suitable means by which the same may be carried into effect, I wish it to be understood that I do not limit myself to the specific materials and structural forms selected for illustration and description, nor in general do I limit myself otherwise than as set forth in the claims read in connection with this specification.

What I claim as new and desire to secure by Letters Patent is:—

1. A conduit for electric conductors, comprising a junction box having an opening therethrough, a tube extending therefrom, a coupling having a plurality of members extending through the opening and surrounding the end of the tube, two lateral flanges extending from each of said coupling members, and screws for connecting said flanges to one another to clamp the coupling members to the end of the tube, substantially as described.

2. A split connector for electrical conduit, comprising a plurality of opposed segments forming when assembled a tubular device, said segments having respectively body portions, and head portions with retaining flanges, said head portions being cut away adjacent to the region of juncture to permit relative tilting movements of said segments, said body portions being provided with coöperating bearing surfaces, said segments being provided with lugs and with draft members engaged with said lugs and serving to draw said segment bodies into clamping engagement with a tubular conduit member, and to expand said head into retentive engagement with the apertured wall of another electrical conduit member, and thereby to set said device in connective relation with said conduit members.

3. A split connector for electrical conduit, comprising a plurality of opposed segments forming when assembled a tubular device, said segments having respectively body portions, and head portions with retaining flanges, said head portions being cut away adjacent to the region of juncture to permit relative tilting movements of said segments, said segments being provided with lugs and with draft members engaged with said lugs and serving to draw said segment bodies into clamping engagement with a tubular conduit member, and to expand said head into retentive engagement with the apertured wall of another electrical conduit member, and thereby to set said device in connective relation with said conduit members.

4. A split connector for electrical conduit, comprising a plurality of opposed segments forming when assembled a tubular device, said segments having respectively body portions and head portions with retaining flanges, said head portions being constructed with lips adjacent to the region of juncture to permit relative tilting movements of said segments to collapse and alternately to expand said head flanges, said segments being provided with lugs and with draft members engaged with said lugs and serving to draw said segment bodies into clamping engagement with a tubular conduit member, and to expand said head into retentive engagement with the apertured wall of another electrical conduit member, and thereby to set said device in connective relation with said conduit members.

5. A split connector for electrical conduit, comprising a plurality of lever segments having respectively head portions with retaining flanges and body portions formed with fulcra to permit relative tilting movements of said segments to contract said body portions and expand said head flanges into retentive engagement respectively with a tubular member and an apertured wall, and draft members to connect said lever segments in assembled relation and to operate the same.

Signed at New York in the county and State of New York this 9th day of March, 1915.

ADNAH McMURTRIE.

Witnesses:
ALEXANDER C. PROUDFIT,
RANDOLPH HARRISON.